United States Patent Office 3,631,041
Patented Dec. 28, 1971

3,631,041
ANTHRAQUINONE DYESTUFFS
Robert Norman Heslop, Manchester, England, assignor to Imperial Chemical Industries Limited, London, England
No Drawing. Filed Jan. 3, 1969, Ser. No. 788,925
Claims priority, application Great Britain, Jan. 16, 1968, 2,406/68
Int. Cl. C07d 55/20, 51/42
U.S. Cl. 260—249          6 Claims

ABSTRACT OF THE DISCLOSURE

The invention provides reactive water-soluble anthraquinone dyestuffs of the formula:

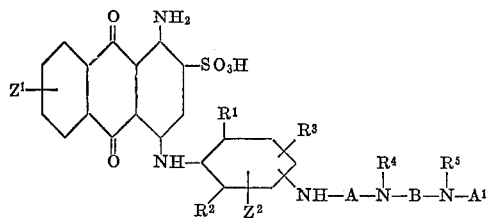

wherein $Z^1$ represents H or $SO_3H$
$R^1$ represents $CH_3$ or $C_2H_5$
$R^2$ represents Cl, Br, $CH_3$ or $C_2H_5$
$R^3$ represents H, $CH_3$ or $C_2H_5$
$Z^2$ represents H, $CH_3$, $C_2H_5$ or $SO_3H$ A represents a s-triazine or pyrimidine nucleus carrying as celluluose-reactive substituent a chlorine or bromine atom or a sulphonic acid group.

$R^4$ and $R^5$ may be the same or different and each represents H, $CH_3$, $C_2H_5$ or $C_2H_4OH$, B represents an aliphatic or cycloaliphatic radical having up to 6 carbon atoms, and $A^1$ represents a radical containing a heterocyclic nucleus in which the nucleus carries at least one substituent capable of reacting with the hydroxyl groups in cellulose.

These new dyestuffs are notable for the following combination of properties, namely, a remarkably high fixation on the fibre whereby washing off treatments can be reduced considerably, a desirable bright reddish-blue shade and high light-fastness.

---

This invention relates to new water-soluble reactive anthraquinone dyestuffs, to the methods of preparation thereof and to the use of such dyestuffs for colouring textile materials.

It has been proposed to use dyestuffs containing a variety of heterocyclic nuclei bearing labile atoms or groups, and in particular, halogeno-s-triazine or halogeno pyrimidine groups, for the purpose of colouring fibres containing hydroxyl groups, especially cellulose materials such as cotton and viscose rayon.

These dyestuffs readily fix on such materials with good fastness to wet processing, since the labile atom or group on the heterocyclic nucleus is able to react with hydroxyl groups of the cellulose molecule in the presence of acid-binding agents, especially at elevated temperatures. For this purpose, the dyestuffs are applied from aqueous solutions or aqueous printing pastes and, owing to a side-reaction in which the labile atom or group reacts with water instead of the cellulose molecule a considerable portion of the dyestuff does not fix on the fibre.

Consequently an excess of dyestuff must be used and the dyeings or prints must be thoroughly washed with boiling soap solutions to remove the unfixed dyestuff. The wastage of dyestuff and extra processing make the dyeing or printing process more expensive when deep shades are required.

The present invention is concerned with the production of water-soluble reactive dyestuffs which have the following combination of properties, namely, a remarkably high fixation on the fibre whereby washing off treatments can be reduced considerably, a desirable bright reddish-blue shade and high light-fastness.

According to the invention there are provided reactive water-soluble anthraquinone dyestuffs of the formula:

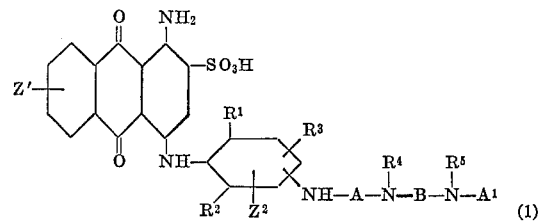

wherein $Z^1$ represents H or $SO_3H$;
$R^1$ represents $CH_3$ or $C_2H_5$
$R^2$ represents Cl, Br, $CH_3$ or $C_2H_5$
$R^3$ represents H, $CH_3$ or $C_2H_5$
$Z^2$ represents H, $CH_3$, $C_2H_5$ or $SO_3H$ A represents a s-triazine or pyrimidine nucleus carrying as cellulose-reactive substituent a chlorine or bromine atom or a sulphonic acid group.

$R^4$ and $R^5$ may be the same or different and each represents H, $CH_3$, $C_2H_5$ or $C_2H_4OH$, B represents an aliphatic or cycloaliphatic radical having up to 6 carbon atoms, and $A^1$ represents a radical containing a heterocyclic nucleus in which the nucleus carries at least one substituent capable of reacting with the hydroxyl groups in cellulose.

As examples of radicals represented by A there may be mentioned 6-chloro- or 6-bromo-2,4-s-triazinyl, chloro-5-cyano-pyrimidinyl.

As examples of aliphatic radicals represented by B, there may be mentioned alkylene radicals having up to 6 carbon atoms, for example, ethylene, 1,3-propylene, 1,6-hexylene, 2-hydroxy- or -sulphato-1:3-propylene, also radicals having one or more hetero-atoms in the aliphatic chain, for example 2,2'-diethylene ether or 2,2'-diethylenesulphone radicals.

As examples of radicals represented by $A^1$ there may be mentioned radicals containing a six-membered heterocyclic ring having 2 or 3 nitrogen atoms in the ring and at least one cellulose-reactive atom or group attached to a carbon atom of the ring in ortho position to a nitrogen atom.

As examples of suitable heterocyclic rings there may be mentioned quinoxaline, quinazoline, phthalazine, pyridazone, pyrimidine and, above all, s-triazine. As examples of cellulose-reactive atoms and groups, there may be mentioned bromine or chlorine, sulphonic acid, methyl sulphonyl, thiocyano, aryloxy or arylthio groups containing an electronegative substituent such as sulphophenoxy, sulphophenylthio, nitrosulphophenoxy, disulphophenoxy and sulphonaphthoxy, groups of the formula:

(2)

wherein Y' represents a group of atoms necessary to form a 5- or 6-membered heterocyclic ring which may carry substituents or form part of a fused ring system;

quaternary ammonium or pyridinium groups, groups of the formula:

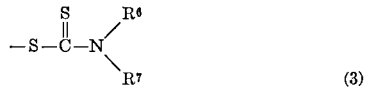

wherein $R^6$ and $R^7$ each represents the same or different alkyl, cycloalkyl, aryl or aralkyl group, or together form, with the nitrogen atom, a 5- or 6-membered heterocyclic ring; groups of the formula

wherein $R^8$ and $R^9$ may be the same or different and each represents a hydrogen atom or an alkyl, aryl or aralkyl group.

The heterocyclic nucleus in $A^1$ can contain substituents other than cellulose-reactive atoms or groups and the nucleus can be attached directly to the $NR^5$ group of Formula 1, for example, by the 2, 4 or 6 carbon atoms in the case of a triazine or pyrimidine nucleus or by way of a bridging carbonyl or sulphonyl group, for example, as in the case of pyrimidine-5-carbonyl group.

Hence as examples of substituents represented by $A^1$ there may be mentioned, for example, 2:3-dichloroquinoxaline-5- or -6-carbonyl,
2:4-dichloroquinazoline-6- or -7-sulphonyl,
2:4:6-trichloroquinazoline-7- or 8-sulphonyl,
2:4:7- or 2:4:8-trichloroquinazoline-6-sulphonyl,
2:4-dichloroquinazoline-6-carbonyl,
1:4-dichlorophthalazine-6-carbonyl,
4:5-dichloropyridazon-1-yl,
2:4-dichloropyrimidine-5-carbonyl,
5-chloro-6-methyl-2-methyl-sulphonylpyrimidin-4-yl,
1-(phenyl-4-carbonyl)4:5-dichloropyridazone, and more particularly-s-triazin-2-yl and pyrimidine-2-yl or -4-yl radicals which contain on at least one of the remaining 2,4 or 6-positions, a bromine or, preferably, a chlorine atom or a cellulose-reactive group of those listed above.

In the case of s-triazine, the ring may have a non-reactive substituent on the remaining carbon atom, for example, primary amino and mono- or di-substituted amino groups, etherified hydroxyl and etherified mercapto groups; in the case of substituted amino groups, this class includes, for example, mono- and di-alkylamino groups, in which the alkyl groups preferably contain at most 4 carbon atoms, and which may also contain substituents for example, hydroxyl- sulphato- or alkoxy groups, and phenylamino and naphthylamino groups which preferably contain one or more solubilising, e.g. sulphonic acid, substituents.

In Formula 1, $Z^1$ preferably represents hydrogen; $R^1$, $R^2$ and $R^3$ preferably each represents a methyl group, $R^3$ can be ortho, meta or para to $R^1$. $Z^2$ preferably represents $SO_3H$, $R^4$ and $R^5$ preferably represent hydrogen, A and $A^1$ preferably represent monochloro-s-triazine radicals, in the case of $A^1$, more especially one bearing a sulphonated anilino group, B preferably represents an alkylene radical having at most 3 carbon atoms, above all, an ethylene radical.

According to a further feature of the invention there is provided a process for manufacture of the new anthraquinone dyestuffs which comprises reacting an amino compound of the general formula:

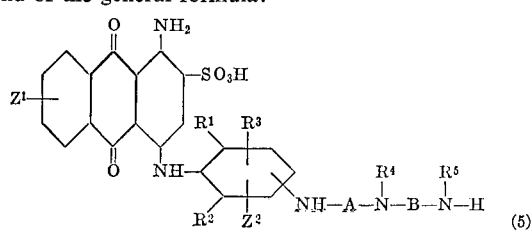

wherein A, B, $R^1$, $R^2$, $R^3$, $R^4$, $R^5$, $Z^1$ and $Z^2$ have the meanings stated above, with one mole of a heterocyclic compound of the formula:

$$A^1 \cdot hal \qquad (6)$$

wherein $A^1$ has the meaning stated above and "hal" represents Cl or Br.

The process can conveniently be carried out by stirring a mixture of the compounds of Formulae 5 and 6 in an aqueous medium, in the presence of an acid-binding agent to absorb the liberated hydrogen halide. The reaction can be carried out at a suitable temperature within the range of from 0° to about 60° C., depending on the particular compound of Formula 6 used.

The compounds of Formula 5 can be obtained by condensing a heterocyclic compound of the formula $$hal-A-hal \qquad (7)$$

wherein A and "hal" have the meanings stated above in either order, with (a) one molecular proportion of an amino-anthraquinone compound of the formula:

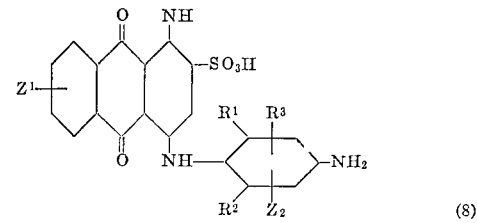

wherein $R^1$, $R^2$, $R^3$, $Z^1$ and $Z^2$ have the meanings stated above and (b) one molecular proportion of a diamine of the formula:

wherein B, $R^4$ and $R^5$ have the meanings stated above, and where the cellulose-reactive substituent in A is a sulphonic acid group, treating the product so obtained with an alkali metal salt of sulphurous acid.

Thus, compounds of Formula 5 can conveniently be obtained by suspending or dissolving the heterocyclic compound in water or a mixture of water with a water-miscible organic solvent, adding one of the other two reagents, or a solution thereof in water or a water-miscible organic solvent, stirring the mixture at a suitable temperature until one chlorine or bromine atom on the heterocyclic compound has been reacted, or substantially so, then adding to the third reactant and stirring at a suitable temperature to effect reaction of the second chlorine or bromine atom. In general, a temperature of 0 to 5° C. is suitable for the first step and a temperature of 25 to 50° C. is suitable for the second step. The reaction is preferably carried out in the presence of an acid-binding agent, added at such a rate as to maintain the pH of the reaction mixture between the limits of 4 and 9.

As examples of compounds of Formula 7 there may be mentioned cynauric chloride, cyanuric bromide, 2,4,5,6-tetrachloro- and tetrabromo-pyrimidines and 5-cyano-2,4,6-trichloro- and tribromopyrimidines.

As examples of compounds of Formula 8 there may be mentioned 1-amino-4-(3'-amino-2',4',6'-trimethylanilino)-anthraquinone-2,5'-disulphonic acid, 1-amino-4,4'-amino-2',3',6'-trimethylanilino)-anthraquinone - 2,5' - sulphonic acid, 1-amino-4-(4'-amino-2',6'-dimethyl or diethylanilino)anthraquinone-2,5'-disulphonic acids, 1-amino-4-(4'-amino-2'-methyl-6'-bromoanilino)anthraquinone - 2 - sulphonic acid.

As examples of diamines of Formula 9 there may be mentioned ethylene diamine, propylene diamine, isopropylene diamine, 2-hydroxypropylene-1:3-diamine, N-(2-hydroxyethyl)ethylene diamine, N:N'-di-(2-hyroxyethyl) ethylene diamine.

As examples of compounds of Formula 6 which can be used there may be mentioned heterocyclic compounds which contain at least 2 nitrogen atoms in the heterocyclic ring and which contain 2 or more halogen atoms, especially chlorine atoms in the ortho positions to the nitrogen atoms, such as 2:3-dichloroquinoxaline-5- and 6-carboxylic acid chlorides,
2:3-dichloroquinoxaline-5- and 6-sulphonyl chlorides,
2:4-dichloroquinazoline-6- and 7-sulphonyl chlorides,
2:4:6-trichloroquinazoline-7- and 8- sulphonyl chlorides,
2:4:7- and 2:4:8-trichloroquinazoline-6-sulphonyl chlorides,
2:4-dichloroquinazoline-6-carboxylic acid chloride,
1:4-dichloro-phthalazine-6-carboxylic acid chloride,
2:4-dichloropyrimidine-5-carboxylic acid chloride,
4,5-dichloro-6-methyl-2-methyl-sulphonylpyrimidine,
β-(dichloropyridazonyl-1)-propionyl chloride,
1-(phenyl-4'-carbonylchloride)-4:5-dichloro-6-pyridazone,
1-(phenyl-4'-chlorosulphonyl)-4:5-dichloro-6-pyridazone,
2:4:6-tribromo and trichloropyrimidines,
2:4:5:6-tetrachloropyrimidine, 5-methyl-2:4:6-trichloropyrimidine,
5-nitro-2:4:6-trichloropyrimidine,
2:4-dichloro-5-nitro-6-methylpyrimidine,
2:4-dichloro-5-nitropyrimidine,
2:4:6-trichloro-5-cyanopyrimidine,
5-carboethoxy-2:4-dichloropyrimidine,
5-carboxy-2:4-dichloropyrimidine,
cyanuric bromide, cyanuric chloride;

the primary condensation products of cyanuric bromide or cyanuric chloride with ammonia, an alkali metal sulphite or thiocyanate or an organic mercaptan, hydroxy compound or an organic primary or secondary amine, for example methanol, ethanol, isopropanol, phenol o,m- and p-chlorophenols, o-, m- and p-cresols, o-, m- and p-sulphophenols, thiophenol, thioglycollic acid, dimethyldithio carbamic acid, mercaptobenzthiazole, thioacetamide, methyl-, dimethyl-, ethyl-, diethyl-, n-propyl, iso-propyl-, butyl-, hexyl-, or cyclohexyl-amine, toluidide, piperidine, morpholine, methoxyethylamine, ethanolamine, aminoacetic acid, aniline-2:5-, 2:4 and 3:5-disulphonic acids, orthanilic, methanilic and sulphanilic acids, 2,3 and 4-aminobenzoic acids, 4- and 5-sulpho-2-aminobenzoic acids, 5-amino-2-hydroxybenzoic acid, 2-amino-ethanesulphonic acid, aminonaphthalene mono- and disulphonic acids and N-methylaminoethane sulphonic acid; also, the secondary condensation products of cyanuric chloride with alkali metal sulphites, alkali metal thiocyanates, phenols and thiophenols containing an electronegative substituent, and compounds of the formulae $$H-S-C\overset{\cdots}{\underset{\cdots}{Y'}} \qquad (10)$$

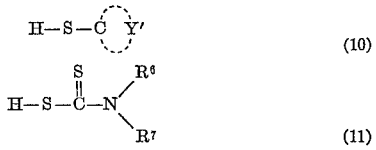

(11)

and

(12)

wherein $Y'$, $R^6$, $R^7$, $R^8$ and $R^9$ have the meanings stated above.

The invention also provides a modification of the above process for manufacture of the dyestuffs in which $A^1$ represents a radical containing water-solubilising groups which comprises reacting a compound of Formula 7 with one mole of an aminoanthraquinone compound of Formula 8 and with one mole of an amine of the formula:

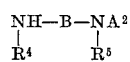

(13)

the symbols A, B, $R^1$, $R^2$, $R^3$, $R^4$, $R^5$, $Z^1$, $Z^2$ and hal. having the meanings stated above, and $A^2$ representing the radical of a heterocyclic compound containing solubilising groups.

The compounds of Formula 13 can be obtained by reacting one mole of a diamine of Formula 9 with one mole of a heterocyclic compound of the formula:

$$A^2 \text{ hal.} \qquad (14)$$

wherein $A^2$ and hal. have the meanings stated above. Where, however, $A^2$ contains a cellulose-reactive group or a non-reactive substituent rather than a cellulose-reactive halogen atom, the said group or substituent can be introduced by reacting a heterocyclic compound of Formula 14 containing only halogen substituents first with a compound of Formula 9 and then with a reactant suitable for exchanging a halogen atom on the heterocyclic nucleus by the cellulose-reactive group or the non-reactive substituent.

The new dyestuffs can be isolated by any of the usual means used in connection with water-soluble reactive dyestuffs, for example, by spray-drying the total reaction mixture, but preferably by the addition of sodium chloride, and filtering off the precipitated dyestuff and drying.

The new dyestuffs can be used for dyeing or printing a wide variety of textile materials e.g. wool and nylon; they are particularly valuable for use as reactive dyes for cellulose with which they are capable, in the presence of acid-binding agents, of reacting with a high degree of efficiency to give bright reddish-blue shades of excellent fastness to washing and to light.

The invention is illustrated but not limited by the following examples in which parts are by weight:

EXAMPLE 1

A neutral solution of 15.9 parts of 1-amino-4-(3'-amino - 2':4':6' - trimethylanilino)anthraquinone-2:5'-disulphonic acid in 400 parts of water is added during 15 minutes to a stirred suspension of 6.6 parts of cyanuric chloride in a mixture of 36 parts of acetone and 180 parts of water at 0–5° C. The pH of the mixture is maintained at 4.5–5.0 by the addition when necessary of 2 N sodium carbonate and stirring under these conditions is continued for a further 1 hour. The reaction mixture is filtered, the filtrates adjusted to pH 6.7 and then added over a period of 5 hours to a stirred solution of 25.3 parts of the disodium salt of 2-chloro-4-β-aminoethyl-amino-6-(2':5'-disulphoanilino)-s-triazine in 200 parts of water at 30° C. the pH of the reaction mixture being maintained at 8.5–8.7 throughout the addition. The mixture is stirred under these conditions for a further 5 hours and then the pH is adjusted to 6.7, the solution filtered and the filtrates treated with 16% (w./v.) sodium chloride. The mixture is filtered from any s-triazine intermediate which has thus been precipitated and the filtrates further treated with sodium chloride to give a total concentration of 27% (w./v.). The suspension is stirred until precipitation of the dyestuff is complete, then filtered and the product washed with 27% (w./v.) sodium chloride solution and finally dried at room temperature.

The dyestuff obtained dyes cellulosic textile materials in bright reddish-blue shades of excellent fasteness to wet treatments and to light.

EXAMPLE 2

A neutral solution of 21.2 parts of 1-amino-4-(3'-amino-2':4':6' - trimethylanilino)anthraquinone-2'5-disulphonic acid in 500 parts of water is reacted with 8.5 parts of cyanuric chloride following the procedure described in Example 1. The resulting solution of the dichloro-triazinyl derivative is filtered, adjusted to pH 6.7 and the solution added over a period of 3 hours to a stirred solution of 34.7 parts of the disodium salt of 2-chloro-4-β-amino-isopropylamino-6-(2':5'-disulphoanilino-s-triazine in 450 parts of water at 40° C., the pH of the reaction mixture being maintained at 8.7–9.0 throughout the addition. The mixture is stirred a further 3 hours under the above conditions, the pH adjusted to 6.7, and the mixture filtered. 32% (w./v.) Sodium chloride is added gradually to the stirred filtrates and the dyestuff so precipitated is filtered, washed with 30% (w./v.) sodium chloride solution and finally dried at room temperature. On cellulosic fibres, the product yields reddish-blue shades slightly greener than those of Example 1 and exhibits the same excellent fastness properites.

By substituting the above 21.2 parts of 1-amino-4-(3'-amino - 2':4':6' - trimethylanilino-anthraquinone-2:5-disulphonic acid by 22.9 parts of 1-amino-4-(3'-amino-2':4':6' - triethylanilino - anthraquinone-2:5-disulphonic acid, a dyestuff very similar in shade and properties to that of Example 1 is obtained.

EXAMPLE 3

15.9 parts of 1-amino-4-(3'-amino-2':4':6'-trimethylanilino)anthraquinone-2:5'-disulphonic acid are reacted with 6.6 parts of cyanuric chloride following the procedure described in Example 1 and the solution of the dichlorotriazinyl derivative obtained, after adjusting to pH 6.7, is added during approximately two hours to a stirred solution of 3.6 parts of ethylene diamine in 120 parts of water which is initially adjusted to pH 8.0 by the addition of concentrated hydrochloric acid. The reaction mixture is maintained at pH 7.5–8.0 and at 15°–20° C. during the addition and stirring under these conditions continued for a further 5 hours. The suspension obtained is filtered, the product redissolved in 1500 parts of water at 40° C. and at pH 10.0 by the addition of 2 N sodium hydroxide and the mono-($\beta$-aminoethyl)-aminotriazinyl compound re-precipitated from the solution by acidification with 2 H hydrochloric acid to pH 6.0. 8% (w./v.) sodium chloride is added, the suspension stirred until aggregation is complete, then filtered and the product washed with 4% (w./v.) sodium chloride solution and finally dried.

8.0 parts of the above product are dissolved in a mixture of 200 parts of water and 16 parts of acetone at pH 11.0 by the addition of 2 N sodium hydroxide. The pH of the solution is then adjusted to approximately 9.0 and a solution of 3.4 parts of 2:4-dichloro-6-(2':5'-disulphoanilino)-s-triazine in 90 parts of water added and the mixture stirred at 35°–40° C. and at pH 8.8–9.0 for 5 hours. The pH of the reaction mixture is adjusted to 6.7, 26% (w./v.) sodium chloride added and the dyestuff so precipitated is filtered and washed with 26% (w./v.) sodium chloride solution. The product was purified by redissolving in 300 parts of water and re-precipitating by addition of 24% (w./v.) sodium chloride; it was finally filtered, washed with 24% sodium chloride solution and dried at room temperature.

The dyestuff obtained is almost identical in properties with that obtained in Example 1.

By substituting the 3.6 parts of ethylene diamine in the above example by 6.2 parts of N-($\beta$-hydroxyethyl-ethylene diamine, a dyestuff having similar properties is obtained.

EXAMPLE 4

A neutral solution of 5.8 parts of 1-amino-4-(2'-bromo-4'-amino-6'-methylanilino)anthraquinone-2:5-disulphonic acid in 200 parts of water is reacted with 2.1 parts of cyanuric chloride following the procedure described in Example 1. The resulting solution of the dichlorotriazinyl derivaitve is filtered, adjusted to pH 6.7 and then reacted with a solution of 8.7 parts of the disodium salt of 2-chloro - 4-$\gamma$-aminopropylamino-6-(3':5'-disulphoanilino)-s-triazine in 150 parts of water following the conditions used in Example 2 for the analogous isomeric s-triazine intermediate. The dyestuff is finally precipitated by the addition of 25% (w./v.) sodium chloride and isolated as described in Example 2. When applied to cellulosic fibres, the product yields bright, very reddish-blue shades possessing very good fastness properties.

EXAMPLE 5

8.0 parts of the 1-amino-4-[3'-(2''-chloro-4''-$\beta$-aminoethylamino - s-triazin-6-ylamino-2':4':6'-trimethylanilino] anthraquinone - 2:5' - disulphonic acid prepared as in Example 3, are dissolved in a mixture of 400 parts of water and 32 parts of acetone at pH 10.5–11.0 by the addition of 2 N sodium hydroxide. The solution is adjusted to pH 9.0 and added over approximately 30 minutes to a stirred suspension of 2.84 parts of cyanuric chloride in 80 parts of water and 16 parts of acetone, the suspension being maintained throughout the addition at 0–5° C. and at pH 8.5–9.0. Stirring under the above conditions is continued for a further 2 hours, the reaction mixture filtered, the pH of the filtrates adjusted to 6.5 and 9.0% (w./v.) sodium chloride added with stirring. When precipitation of the dyestuff is complete, the suspension is filtered and the product washed with 9% sodium chloride solution and finally dried at room-temperature.

The dyestuffs obtained yields bright reddish-blue shades possessing excellent fastness properties when applied to cellulosic materials by dyeing or printing techniques.

Bright reddish-blue dyestuffs with similar properties are obtained, following a similar procedure to that described above, by acylation of the anthraquinone derivatives shown in column 1 with the acylating agents given in column 2.

| Column 1 | Column 2 |
| --- | --- |
| 1-amino-4-[3'-(2''-chloro-4''-$\beta$-amino-ethylamino-s-triazin-6''-yl-amino)-2':4':6'-trimethylanilino]anthraquinone-2:5'-disulphonic acid. | 2:4-dichloro-6-methoxy-s-triazine. |
| Do | 4:5-dichloro-6-methyl-2-methylsulphonyl-pyrimidine. |
| Do | 2:4:5:6-tetrachloro-pyrimidine. |
| 1-amino-4-[3'-(2''-chloro-4''-$\gamma$-amino-$\beta$-hydroxypropylamino-s-triazin-6''-ylamino)-2':4':6'-trimethylanilino]-anthraquinone-2:5'-disulphonic acid. | 2:4:6-trichloro-5-cyano-pyrimidine. |
| 1-amino-4-[4'-(2''-chloro-4''-$\beta$-amino-ethylamino-s-triazin-6''-yl-amino)-2':3':6'-trimethylanilino]anthraquinone-2:5'-disulphonic acid. | 2:3-dichloroquinoxaline-6-carbonyl chloride. |
| 1-amino-4-[3'-(2''-chloro-4''-$\gamma$-amino-propylamino-s-triazin-6''-yl-amino)-2':4':6'-trimethylanilino]anthraquinone-2:5'-disulphonic acid. | 2:4-dichloropyrimidine-5-carboxy chloride. |
| Do | $\beta$-(4:5-dichloropyridazon-1-yl)propionylchloride. |

EXAMPLE 6

A neutral solution of 5.3 parts of 1-amino-4-(3'-amino-2':4':6' - trimethylanilino)anthraquinone-2:5'-disulphonic acid in 100 parts of water is added in approximately 10 minutes to a stirred suspension of 2.5 parts of 5-cyano-2:4:5-trichloropyrimidine in 60 parts of water and 8 parts of acetone, the reaction mixture being maintained at pH 5.5–6.0 and at 15°–20° C. throughout the addition. The mixture is stirred under the above conditions for a further 6 hours during which period a further 20 parts of acetone are added. The reaction mixture is filtered, the filtrates adjusted to pH 6.5 and then added during 30 minutes to a solution of 7.0 parts of the disodium salt of 2-chloro-4-$\beta$-aminoethylamino-6-(2':5'-disulphoanilino)-s-triazine in 60 parts of water which is maintained at 30°–32° C. and at pH 9.0. The mixture is stirred for approximately 7 hours under the above conditions, then adjusted to pH 6.7 and 30% (w./v.) sodium chloride added. The product so precipitated is filtered, washed with 30% (w./v.) sodium chloride solution and dried. The dyestuff obtained is very similar in its properties to those exhibited by the product of Example 1.

By substituting the above 7.0 parts of the disodium salt of 2 - chloro - 4-$\beta$-aminoethylamino-6-(2':5'-disulphoanilino)-s-triazine by an equivalent amount of 6-chloro-5-cyano - 4 - $\beta$-aminoethylamine-2-(3'-sulphoranilino)pyridine, a similar dyestuff is obtained.

We claim:
1. A reactive dyestuff of the formula:

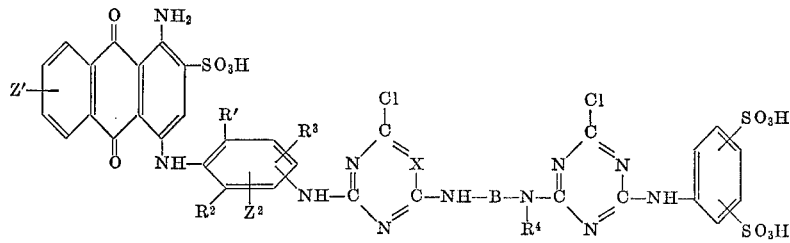

in which
Z' represents H or $SO_3H$
R' represents $CH_3$ or $C_2H_5$
$R^2$ represents Br, $CH_3$ or $C_3H_5$
$R^3$ represents H, $CH_3$ or $C_2H_5$
$Z^2$ represents H or $SO_3H$
X represents N or C–CN
B represents an alkylene group of 2 or 3 carbon atoms and
$R^4$ represents H or $\beta$-hydroxyethyl.

2. A reactive dyestuff as claimed in claim 1 wherein $Z^1$ represents a hydrogen atom.

3. A reactive dyestuff as claimed in claim 1 wherein $R^1$, $R^2$ and $R^3$ each represents a methyl group.

4. A reactive dyestuff as claimed in claim 1 wherein $R^2$ represents $SO_3H$.

5. A reactive dyestuff as claimed in claim 1 wherein $R^4$ and $R^5$ each represents a hydrogen atom.

6. The anthraquinone dyestuff of the formula:

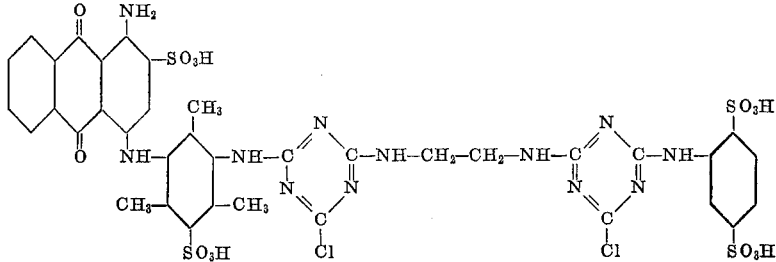

References Cited
UNITED STATES PATENTS 3,226,176  12/1965  Hindermann et al __ 260—249 X
3,426,018  2/1969  Eckersley et al. ____ 260—249 X JOHN M. FORD, Primary Examiner U.S. Cl. X.R.

260—256.5 R; 8—40